(12) United States Patent
Hardacker et al.

(10) Patent No.: US 8,280,222 B2
(45) Date of Patent: Oct. 2, 2012

(54) USE OF METADATA IN VIDEO TO ESTABLISH TV SETTINGS

(75) Inventors: Robert Hardacker, Escondido, CA (US); Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 508 days.

(21) Appl. No.: 12/574,047

(22) Filed: Oct. 6, 2009

(65) Prior Publication Data

US 2011/0080522 A1 Apr. 7, 2011

(51) Int. Cl.
*H04N 9/80* (2006.01)
*H04N 5/92* (2006.01)
*H04N 5/917* (2006.01)
*H04N 5/89* (2006.01)
*H04N 15/00* (2006.01)

(52) U.S. Cl. ........ 386/239; 386/240; 386/245; 386/248; 386/326; 386/330; 386/334; 386/337; 348/41.12; 348/40; 348/41

(58) Field of Classification Search .......... 386/239, 386/240, 245, 248, 326, 330, 334, 337; 348/14.12, 348/40, 41
See application file for complete search history.

(56) References Cited

U.S. PATENT DOCUMENTS

| | | | | |
|---|---|---|---|---|
| 5,570,134 A | * | 10/1996 | Hong | .......... 348/467 |
| 2003/0135857 A1 | * | 7/2003 | Pendakur et al. | ....... 725/61 |
| 2008/0091713 A1 | | 4/2008 | Candelore et al. | |
| 2008/0297656 A1 | * | 12/2008 | Saito | .......... 348/554 |
| 2008/0313688 A1 | * | 12/2008 | Kim et al. | ....... 725/110 |
| 2009/0060055 A1 | | 3/2009 | Blanchard et al. | |
| 2009/0249420 A1 | * | 10/2009 | Kim et al. | ....... 725/115 |
| 2010/0023963 A1 | * | 1/2010 | Crookes et al. | ...... 725/31 |

FOREIGN PATENT DOCUMENTS

| | | |
|---|---|---|
| JP | 2002203070 | 7/2002 |
| JP | 2005130196 | 5/2005 |
| JP | 2007074158 | 3/2007 |

OTHER PUBLICATIONS

Robert Hardacker, et al. "On-Screen Display to Highlight What a Demo Video is Meant to Illustrate", co-pending application, file history for U.S. Appl. No. 12/573,629, filed Oct. 5, 2009.
Standalone High Definition Digital Photo TV Player—Digital Signage Solution. http://cgi.ebay.com.my/ws/eBayISAPI. dll?ViewItem&item=260295673768&ssPageName=MERC_VI_RCRX_Pr4_PcY_BIN_Stores_IT&refitem=250337738578&itemcount=4&refwidgetloc=active_view_item&usedrule1=CrossSell_LogicX&refwidgettype=cross_promot_widget&_trksid=p284.m184&_trkparms=algo%3DCRX%26its%3DS%252BI%252BSS%26itu%3DISS%252BUCI%252BSI%26otn%.

* cited by examiner

*Primary Examiner* — Daquan Zhao
(74) *Attorney, Agent, or Firm* — John L. Rogitz

(57) ABSTRACT

Metadata defining TV video settings is embedded in or otherwise accompanies a video stream. The metadata is executed by the TV to establish the settings, which consequently may be optimized for the particular video stream.

7 Claims, 2 Drawing Sheets

USE OF METADATA IN VIDEO TO ESTABLISH TV SETTINGS

FIELD OF THE INVENTION

The present application relates generally to using metadata in video streams to automatically establish TV settings.

BACKGROUND OF THE INVENTION

The sale of TVs is extremely competitive. Demonstrating the differences between TV models on a showroom floor is increasingly difficult as TV technology becomes more complex. Demonstration material in the form of printed publications often is used to extol the advantages of one TV over another, but such material often is either ignored or of limited use.

For example, demonstration material might extol the quality of the picture but picture quality can depend on establishing optimum settings in the TV, and sales people may not be sufficiently trained to establish these settings. Also, shoppers can and do change the settings, and present principles understand that preventing access to settings changes on the showroom floor is less than desirable because it can frustrate shoppers. Furthermore, as recognized herein some settings may be optimum for viewing one demonstration video but not for viewing another demonstration video.

Likewise, once a TV is purchased its initial settings often are never changed by the buyer, who might not know how to change the settings or even that they might be changeable. This means that the TV might not render content using optimum settings for that content.

SUMMARY OF THE INVENTION

Accordingly, a system includes a TV display and a TV processor controlling the display and accessing a tangible computer readable storage medium bearing instructions. The instructions cause the processor to receive a video stream and metadata associated with the stream. The processor presents the video stream. The instructions also cause the processor to automatically establish at least one TV setting indicated by the metadata when presenting the video.

In example embodiments the video with metadata is provided on an optical disk engageable with a disk player communicating with the TV processor. The TV processor can be programmed to recognize the metadata such that TV processors not programmed to recognize the metadata can play the video stream but cannot read the metadata.

In example embodiments the setting includes one or more of colorimetry settings, brightness, backlighting, contrast, color space, balance, and digital signal processor (DSP) settings. If desired, the TV processor may present on the TV display a user interface enabling a viewer to select whether to invoke automatic establishment of the setting in accordance with the metadata.

In specific embodiments the metadata identifies not only a video setting but also an associated magnitude of the setting for automatic establishment thereof on the TV display by the TV processor. Metadata representing settings can be embedded in the video stream periodically in the stream so that if a viewer starts the video stream at a mid-point therein, metadata defined settings are established. The metadata can be embodied in consumer electronics control (CEC) code that accompanies the stream.

In another aspect, a computer readable storage medium stores at least one video and metadata associated with the video. The metadata defines at least one display setting and an associated value therefor, such that a TV processor receiving the video with metadata establishes the display setting with associated value on a TV display.

In another aspect, a method includes correlating code to TV settings and settings magnitudes. The method then includes embedding the code in a video transport stream (TS) and/or in consumer electronics control (CEC) provided with the TS, such that a TV receiving the TS can access the code and automatically establish the TV settings and settings magnitudes represented thereby.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
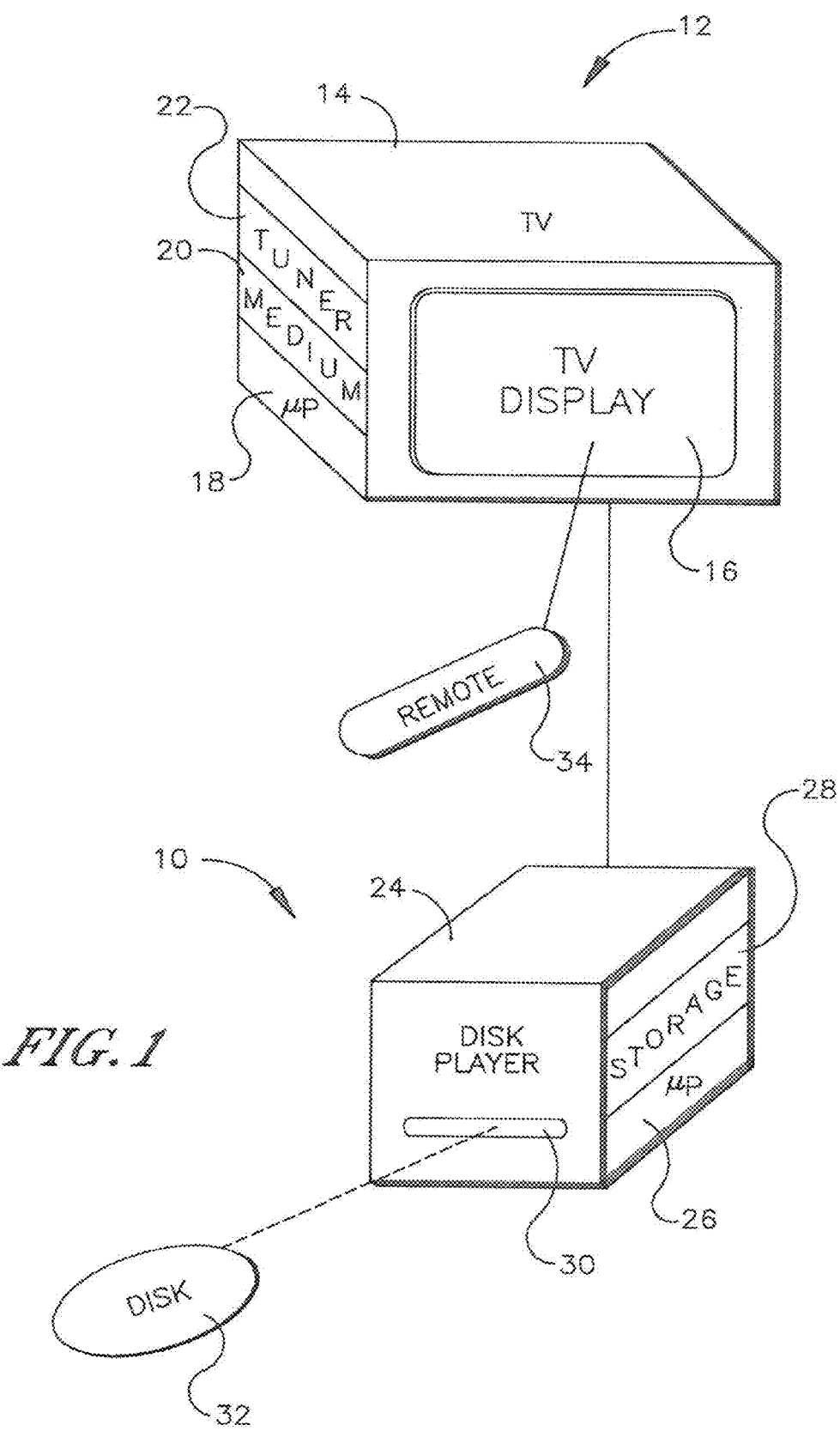
FIG. 1 is a block diagram of an example system in accordance with present principles.

Referring initially to FIG. 1, a system 10 is shown that includes a TV 12 with TV chassis 14 bearing a TV display 16 such as but not limited to a flat panel matrix or plasma display. The display 16 is controlled by a TV processor 18 accessing a computer readable storage medium 20 to present video images from a selected video source such as a TV tuner 22 or other over the air broadcast receiver or disk player 24. Other sources of video may be provided, e.g., the Internet, a home theater, a cable head end, etc.

The computer readable storage medium may be solid state or disk-based storage containing data and instructions to the TV processor 18 to execute portions of the logic divulged below. It is to be understood that while FIG. 1 shows that the processor 18, medium 20, and TV tuner 22 are in the chassis 14, in alternate embodiments one or more of these components may be separately housed in, e.g., a set-top box.

The disk player 24 typically contains a disk processor 26 accessing a computer readable storage medium 28. Also, the disk player 24 can include one or more receptacles 30 for receiving one or more optical video disks 32 therein, for processing of data on the disk 32 and sending resulting image information to the TV processor 18 for presentation on the TV display 16. The disk player 24 alternatively may be incorporated into the TV chassis 14, or a home theater console, or other appliance. A user can input wireless commands to the TV using a portable remote control device 34.

Figure 2:
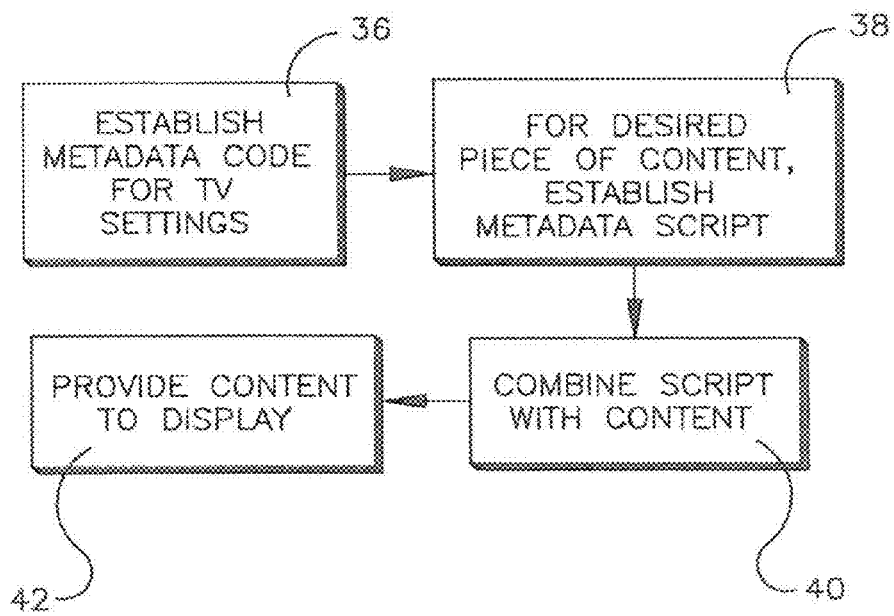
FIG. 2 is a flow chart of example set-up logic.

FIG. 2 commences at block 36 in which metadata code is established corresponding to desired TV settings and their magnitudes. For example, one field of the metadata code can represent the particular TV setting and another field of the code can represent the desired magnitude of that setting. Example TV settings represented by the metadata code include colorimetry settings, brightness, backlighting, contrast, color space, balance, and DSP settings.

Proceeding to block 38, for a piece of video content for which it is desired to establish optimum settings for a particular TV model as desired by, e.g., technical support personnel for typical showroom presentation conditions or as desired by a production studio for typical in-home presentation conditions, a metadata script is established. For example, a studio may desire a subdued, soft video setting for an intimate scene and more vivid high contrast settings for an action scene. In any case, the metadata script defines one or more TV settings and the magnitude(s) thereof for the entire video, or for segments of the video, with settings from one segment to the next being automatically changeable as defined by the script.

Thus, timing information can be included explicitly or implicitly in the script. For example, a script command might include an explicit command to establish a particular magnitude for a particular setting at a particular elapsed time into the video, or at a particular frame number in the video. Or, the metadata script may insert a settings command at a particular location in the transport stream of the video for immediate setting(s) modification as soon as the metadata is received, which is an example of an implied time command. Yet again, settings commands may be embedded in the content file and repeated periodically throughout the file so that if a viewer starts the video at some mid-point, the optimum settings can still be established.

In any case the script is combined with the content stream or file at block 40. In example non-limiting embodiments the script may be combined with the video transport stream (TS) itself, e.g., in predetermined fields of the TS, or it may be embodied in consumer electronics control (CEC) code or an HDMI Ethernet channel that accompanies HDMI streams in the case of, e.g., content configured for certain optical disk systems. In the case of IP video streaming the metadata can be provided in predetermined fields of the IP stream. The content is then provided to the display at block 42 by, e.g., engaging the disk 32 with the player 24, or by Internet streaming, or by OTA or satellite broadcast, over a cable, etc.

In still other embodiments infrared (IR) blasting can be used in which parameter metadata is translated to IR codes and then "blasted" to the display. This may be accomplished similarly to universal remote codes in which a code set number is specified at installation.

Figure 3:
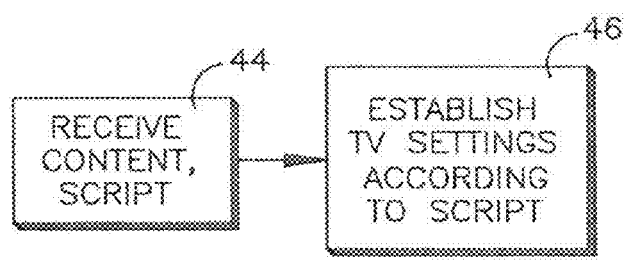
FIG. 3 is a flow chart of example operating logic.

With the above in mind, at block 44 in FIG. 3 the TV 12 receives the content with accompanying metadata from, e.g., the disk 32. When the metadata is part of the TS the TV 12 extracts the metadata from the TS. Or, when the metadata is part of the CEC information the TV receives the metadata over a CEC connection, with the video content being received over, e.g. a high definition multimedia interface (HDMI) connection. At block 46 one or more of the above-mentioned example TV settings with associated magnitude is automatically established by the TV 12 according to the script.

Thus, in one example the TV 12 can be displayed in a retail outlet and a demonstration video disk 32 engaged with the video disk player 24. As the disk plays at block 46, the TV 12 presents video on the disk and also changes TV settings as dictated by the script to optimize the viewing experience.

If desired, the metadata protocol to establish settings may be executable by all TVs with a digital processor, in which case the metadata describes the preferred rendering and the TV in turn correlates the metadata to internal commands that produce the preferred rendering, or the metadata protocol may be proprietary, particularly in the case of intended showroom model display. In the latter case, only TVs made by a particular manufacturer are programmed to read the script and execute commands therein. Thus, in such an embodiment only TVs programmed to read the metadata can exploit the automatic settings feature described herein. Other TVs, e.g., TVs made by other manufacturers but not programmed to read the metadata in the video, can present the demonstration video but not automatically establish TV settings. It is to be understood that equivalently, a set-top box associated with the TV might receive the metadata and issue the corresponding settings commands for execution by the TV.

Figure 4:
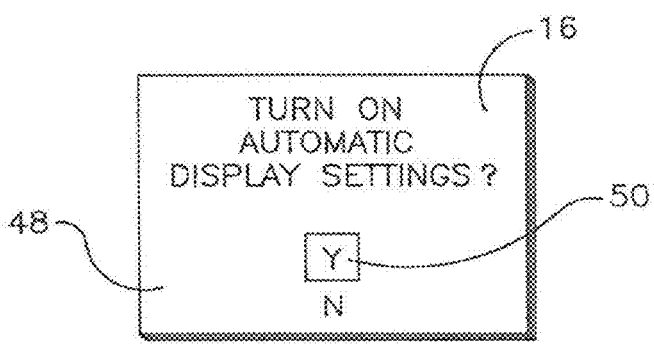
FIG. 4 is a screen shot of an example enablement display.

In some embodiments the viewer can be given the option of enabling and disabling the automatic metadata-based settings establishment described above, and FIG. 4 shows an example screen shot of a user interface for doing so. As indicated at 48 in FIG. 4 a message can be presented on the display 16 asking the viewer if automatic display settings establishment is desired. If the user selects "yes" as indicated at 50 then the logic of FIG. 3 is executed by the TV; otherwise, it is not. If desired, a "no" (disable automatic settings establishment) may be valid for only a limited time period, e.g., a minute, so that upon the elapse of the time period the TV would re-enable the logic of FIG. 3.

While the particular USE OF METADATA IN VIDEO TO ESTABLISH TV SETTINGS is herein shown and described in detail, it is to be understood that the subject matter which is encompassed by the present invention is limited only by the claims.

What is claimed is:

1. System comprising:
   TV display;
   TV processor controlling the display and accessing a tangible computer readable storage medium bearing instructions to cause the processor to:
   receive a video stream and metadata associated with the stream; and
   automatically establish at least one TV setting indicated by the metadata according to a metadata script defining one or more TV settings and magnitude(s) thereof for segments of the video streams, with settings from one segment to next segment being automatically changeable as defined by the script, such that timing information is included explicitly or implicitly in the script;
   wherein the TV processor is programmed to recognize the metadata,
   wherein TV processors not programmed to recognize the metadata can play the video stream but cannot read the metadata.

2. The system of claim 1, wherein the video with metadata is provided on an optical disk engageable with a disk player communicating with the TV processor.

3. The system of claim 1, wherein the setting includes at least one of: colorimetry settings, brightness, backlighting, contrast, color space, balance, and DSP settings.

4. The system of claim 1, wherein the TV processor presents on the TV display a user interface enabling a viewer to select whether to invoke automatic establishment of the setting in accordance with the metadata.

5. The system of claim 1, wherein the metadata identifies a video setting and an associated magnitude of the setting for automatic establishment thereof on the TV display by the TV processor.

6. The system of claim 1, wherein metadata representing settings is embedded in the video stream periodically in the stream so that if a viewer starts the video stream at a mid-point therein, meta-data defined settings are established.

7. The system of claim 1, wherein the metadata is embodied in consumer electronics control (CEC) code that accompanies the stream.

* * * * *